(No Model.)

O. TABER & H. F. LOW.
HARNESS SADDLE.

No. 424,623. Patented Apr. 1, 1890.

Witnesses.
Frederick L. Emery
Howard F. Eaton

Inventor.
Orrin Taber,
Hamilton F. Low,
by Crosby & Gregory Attys.

UNITED STATES PATENT OFFICE.

ORRIN TABER AND HAMILTON F. LOW, OF WILTON, ASSIGNORS TO THE NASHUA SADDLERY HARDWARE COMPANY, OF NASHUA, NEW HAMPSHIRE.

HARNESS-SADDLE.

SPECIFICATION forming part of Letters Patent No. 424,623, dated April 1, 1890.

Application filed August 23, 1889. Serial No. 321,726. (No model.)

*To all whom it may concern:*

Be it known that we, ORRIN TABER and HAMILTON F. LOW, of Wilton, county of Hillsborough, State of New Hampshire, have invented an Improvement in Saddles, of which the following description, in connection with the accompanying drawings, is a specification, like letters on the drawings representing like parts.

This invention has for its object to improve and simplify the construction of the saddle-tree shown and described in an application of Orrin Taber, Serial No. 301,239, filed February 26, 1889. In said application the saddle-tree has formed on its under side shoulders and a lip, and the checkrein-hook has an extended shank that occupies a position between the shoulders, the end of it resting on the lip, and a suitable fastening is provided for the hook and seat.

In accordance with this invention an additional fastening is supplied for holding the seat on the tree, it being so located as to be held in place by the shank of the hook, so that it cannot become loosened or detached; also, in this our present invention an angular hole is formed through the seat, and a lip concentric with said hole projects downwardly from the under side of the seat. A hole is also formed through the tree, and a lip concentric with said hole projects upwardly therefrom. One of the concentric lips presents a space or recess to receive the other. A bolt, having on it a conical nut fitting frictionally in a tapering concavity or a countersink formed on the under side of the shank of the hook, passes through the holes in the seat and tree.

Figure 1:
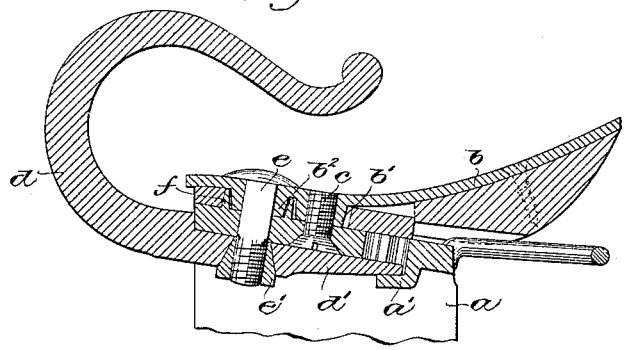
Figure 2:
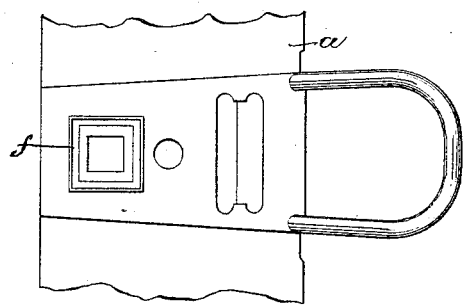
Figure 3:
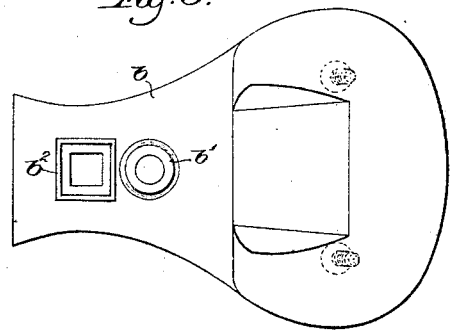

Figure 1 shows in vertical section a portion of a saddle embodying this invention; Fig. 2, a top view of the central portion of the tree, and Fig. 3 an under side view of the seat.

The tree $a$ has formed on its under side shoulders (not shown) and a lip $a'$. The seat $b$, of usual shape, has formed on its under side a boss $b'$, which serves as a rest or riser for the seat, and also has a hole through it encircled by a lip $b^2$, both the hole and lip being shown as quadrangular. The tree has a hole through it registering with the hole in the seat to receive the bolt $e$, said hole in the tree being encircled by an upwardly-projecting lip $f$. The lips $b^2$ and $f$ are herein shown as quadrangular, the lip $b^2$ entering the space or recess formed by the lip $f$ for the purpose of preventing the seat from turning on the tree. The bolt $e$, which passes through the seat, tree, and hook, is herein represented as quadrangular in cross-section. The nut $e'$ for the bolt is herein shown as conical or tapering, fitting a countersink or tapering socket in the hook frictionally, the friction produced materially assisting in preventing the nut from turning on the bolt.

We claim—

1. The seat having an angular hole through it, and having on its under side around said hole a vertical wall, combined with a saddle-tree having a hole through it registering with the angular hole through the seat, and having on its upper side around the hole a vertical wall, one of said vertical walls forming a recess for the other, a hook the shank of which is located beneath the tree and has a hole through it registering with the hole in the tree and shank above it, and a bolt having an angular shank passing through the said holes in the seat-tree and hook, and a nut for the said bolt, substantially as described.

2. In a saddle, a seat and tree and a screw or equivalent fastening by which they are connected, combined with a checkrein-hook having a shank which conceals and holds in position the said fastening, substantially as described.

In testimony whereof we have signed our names to this specification in the presence of two subscribing witnesses.

ORRIN TABER.
HAMILTON F. LOW.

Witnesses:
BERNICE J. NOYES,
FREDERICK L. EMERY.